(12) United States Patent
Swaminathan et al.

(10) Patent No.: US 11,720,469 B1
(45) Date of Patent: Aug. 8, 2023

(54) CUSTOMIZING STRESSMARKS IN A COMPUTER SYSTEM

(71) Applicant: INTERNATIONAL BUSINESS MACHINES CORPORATION, Armonk, NY (US)

(72) Inventors: Karthik V Swaminathan, Mount Kisco, NY (US); Ramon Bertran Monfort, New Orleans, LA (US); Alper Buyuktosunoglu, White Plains, NY (US); Pradip Bose, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/054,603

(22) Filed: Nov. 11, 2022

(51) Int. Cl.
*G06F 11/34* (2006.01)
*G06F 11/30* (2006.01)

(52) U.S. Cl.
CPC ...... *G06F 11/3414* (2013.01); *G06F 11/3075* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 9,507,646 B2 | 11/2016 | Bertran | |
| 9,575,868 B2 | 2/2017 | Bertran | |
| 9,618,999 B1 * | 4/2017 | Bertran | ............... G06F 1/324 |
| 9,798,546 B2 | 10/2017 | Bertran | |
| 10,042,642 B2 | 8/2018 | Bertran | |
| 10,338,993 B1 | 7/2019 | Lekivetz | |
| 10,896,146 B2 | 1/2021 | Swaminathan | |
| 11,074,155 B2 | 7/2021 | Buyuktosunoglu | |
| 11,113,167 B1 | 9/2021 | Hicks | |
| 11,132,273 B1 | 9/2021 | Hicks | |

(Continued)

OTHER PUBLICATIONS

Disclosed Anonymously, "Method and System of Proactive Auto-Scaling", ip.com, IPCOM000260304D, https://ip.com/IPCOM/000260304, Nov. 11, 2019, pp. 1-3.

(Continued)

*Primary Examiner* — Qing Chen
(74) *Attorney, Agent, or Firm* — David Spalding

(57) ABSTRACT

A computer-implemented method, a computer system and a computer program product customize generation and application of stress test conditions in a processor core. The method includes receiving a workload at the processor core, where the workload includes a plurality of instructions and the processor core comprises a plurality of macros. The method also includes obtaining macro performance data for each macro in the plurality of macros from the processor core. The method further includes determining a switching activity level for each macro in the plurality of macros when each instruction in the plurality of instructions is run based on the macro performance data. Lastly, the method includes generating a stressmark comprising the plurality of instructions in the workload, where the stressmark is associated with a macro in the plurality of macros when the switching activity level for the macro is above a minimum threshold.

20 Claims, 4 Drawing Sheets

(56) References Cited

U.S. PATENT DOCUMENTS

| | | | |
|---|---|---|---|
| 11,204,848 B1 | 12/2021 | Hicks | |
| 2016/0110198 A1* | 4/2016 | Bertran | G06F 9/3005 712/228 |
| 2016/0110276 A1* | 4/2016 | Bertran | G06F 9/3005 714/47.2 |
| 2016/0110278 A1* | 4/2016 | Bertran | G06F 11/3428 714/47.2 |
| 2017/0109169 A1* | 4/2017 | Bertran | G06F 9/30145 |

OTHER PUBLICATIONS

Disclosed Anonymously, "Method To Improve Workload Management By Analyzing Systemexternal Events", ip.com, IPCOM000263359D, https://ip.com/IPCOM/000263359, Aug. 24, 2020, pp. 1-5.

Disclosed Anonymously, "System and Method for Super Imposing Event Data With Time Series Data for Faster Problem Determination for Storage Performance Management Proactively", ip.com, IPCOM000260166D, https://ip.com/IPCOM/000260166, Oct. 28, 2019, pp. 1-4.

Gabel et al., "Latent Fault Detection With Unbalanced Workloads", Lawrence Livermore National Laboratory, Conf-6655287, https://scholar.google.com/scholar_url?url=https://www.osti.gov/servlets/purl/1182232&hl=en&sa=X&ei=APY2Y6j1HaiTy9YP3ZSYqAE&scisig=AAGBfm1HizdZX5i4qy81CXCpKL9TI4nU6Q&oi=scholarr, Dec. 10, 2014, pp. 1-9.

Swaminathan et al., "Generation of stressmarks for early stage soft-error modeling", IEEE, Conference Paper, https://ieeexplore.ieee.org/document/8805774, Accessed Sep. 30, 2022, pp. 1-8.

Wu et al., "Effective Dynamic Detection of Alias Analysis Errors", ResearchGate, https://www.researchgate.net/publication/262297082_Effective_dynamic_detection_of_alias_analysis_errors?enrichId=rgreq-964abf77d0a891bcab9489f343e26632-XXX&enrichSource=Y292ZXJQYWdlOzI2MjI5NzA4MjtBUzozNzQxOTQ0MTcyMjU3MjhAMTQ2NjlyNjMwOTc4OQ%3D%3D&el=1_x_2&_esc=publicationCoverPdf, Conference Paper, Aug. 2013, pp. 1-12.

* cited by examiner

CUSTOMIZING STRESSMARKS IN A COMPUTER SYSTEM

STATEMENT REGARDING FEDERALLY SPONSORED RESEARCH OR DEVELOPMENT

This invention was made with government support under HR0011-18-C-0122 awarded by Defense Advanced Research Projects Agency (DARPA). The government has certain rights to this invention.

BACKGROUND

Embodiments relate generally to the field of computer system performance analysis and more specifically, to customized generation and application of stressmarks in a computer system.

Multi-processor computer systems may be vulnerable to several types of hard faults, which may be particularly exacerbated by aging or harsh environmental conditions, and such errors may lead to a discarded processor core, which may in turn lead to significantly higher costs and loss of efficiency in available computer resources. Such errors may be detected through runtime verification of a processor core, where a particular instruction or sequence of instructions, known as a stressmark, may be used to put a desired type of stress on a computer system, e.g., a low-power condition, a high-power condition, or a high inductive noise condition. Faults and errors may be revealed in an efficient way prior to the overall performance of the computer system being compromised by applying stressmarks to the computer system that could result in extreme testing conditions, e.g., a maximum or a minimum condition, or a maximum rate of change for one or more metrics of interest.

SUMMARY

An embodiment is directed to a computer-implemented method for customizing generation and application of stress test conditions in a processor core. The method may include receiving a workload at the processor core, where the workload includes a plurality of instructions, and the processor core comprises a plurality of macros. The method may also include obtaining macro performance data for each macro in the plurality of macros from the processor core. In addition, the method may include determining a switching activity level for each macro in the plurality of macros when each instruction in the plurality of instructions is run based on the macro performance data. Lastly, the method may include generating a stressmark comprising the plurality of instructions in the workload, where the stressmark is associated with a macro in the plurality of macros when the switching activity level for the macro is above a minimum threshold.

In another embodiment, the method may include determining a required output state of the processor core when the workload runs on the processor core and associating the required output state with the stressmark.

In a further embodiment, the method may include storing the stressmark in a stressmark database, where the stressmark database associates the stressmark with the macro and the required output state.

In yet another embodiment, the method may include identifying a candidate macro in the plurality of macros of the processor core. The method may also include selecting a related stressmark from the stressmark database, where the candidate macro is associated with the related stressmark. The method may further include determining a test output state of the processor core by running the related stressmark on the processor core. Lastly, the method may include deactivating the processor core when the test output state does not meet the required output state.

In another embodiment, the workload is suspended in the processor core when the switching activity level is above a maximum threshold.

In a further embodiment, the macro performance data comprises a metric selected from a group consisting of: cycle switching, data residency, and switching density.

In yet another embodiment, a machine learning model that predicts a switching activity level for the processor core based on running workloads is used to determine the minimum threshold for the switching activity level for each macro in the plurality of macros.

In addition to a computer-implemented method, additional embodiments are directed to a computer system and a computer program product for customizing generation and application of stress test conditions in a processor core.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
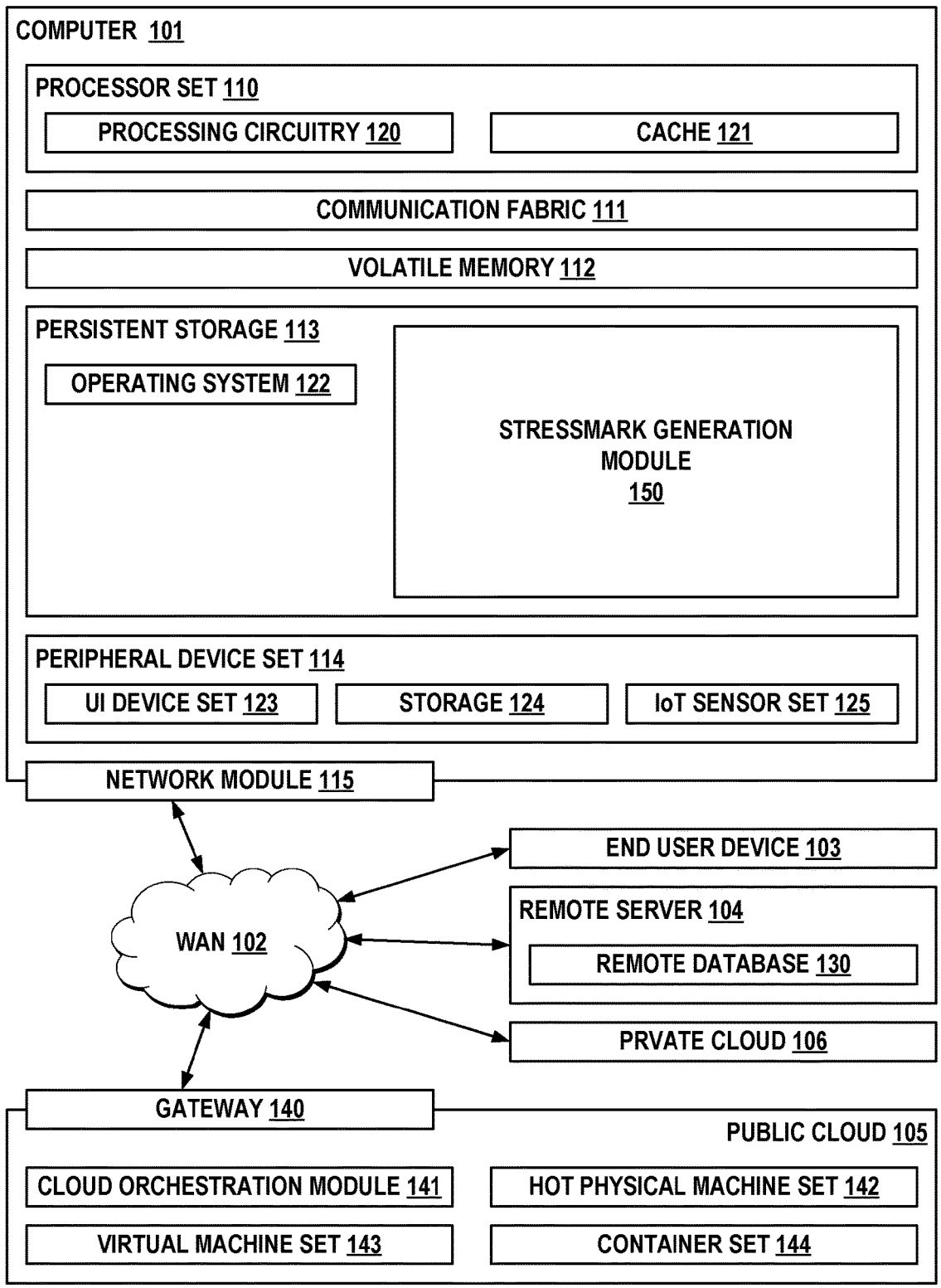
FIG. 1 depicts a block diagram of an example computer system in which various embodiments may be implemented.

Computer systems may be vulnerable to several types of runtime faults due to the physical characteristics of the semiconductors used to fabricate the processors that are used in such systems. Such faults may be particularly exacerbated by aging and harsh environmental conditions. For instance, embedded System on a Chip (SoC) hardware may undergo less rigorous pre/post-silicon characterization and limited burn-in testing, which could make them vulnerable to aging errors. Because many computer systems that rely on such processors are also trusted to run high-sensitivity and high-value applications by organizations, ongoing verification testing may be critical in assuring efficiency and availability of computing resources to those organizations. However, current on-field verification tests are usually workload-agnostic and may only focus on a small part of the processor core. For example, Memory Built-In Self Test (MBIST) tests for memories, such as SRAM arrays and register files, and cyclic redundancy check (CRC) checks for compute units like multiply-divide units. This may be problematic as multi-processor systems become more dedicated to running a fixed set of applications with a limited instruction footprint, as has been observed both in embedded/mobile SoCs as well as large High Performance Computing (HPC) systems.

In addition, existing runtime checking mechanisms, e.g., parity protection, error-correcting code (ECC), or instruction retry, may typically be designed to focus on transient errors and not hard errors and may also be geared towards memory chips, whereas a similar infrastructure for logic, e.g., Logic Built-In Self Test (LBIST), may require complex additional hardware with intrusive modifications made to the existing design. However, the presence of hard errors may force the processor core to be discarded as a whole, which could result in significant loss in computing resources. While on-chip thermal sensors measuring characteristics such as Negative-bias temperature instability (NBTI) may be used to determine emergency conditions, this data is not typically used in the verification methodology to prevent future occurrence of these events. Lastly, not all possible processor runtime configurations would typically be covered by the existing tests and there can be significant changes in latch failure rates particularly due to voltage and frequency scaling that may not be caught.

Therefore, it may be useful to provide a method or system for automated generation of runtime performance and functional verification tests that stress the relevant hardware components. Available runtime performance data may be used to generate a customized instruction set, known as a stressmark, that may target specific macros based on switching activity levels, where specific stressmarks may be designed or selected for the express purpose of maximizing switching activity in a targeted macro, or stressing the macro to locate problems or errors. Such a method or system may help guarantee correct execution of the target application and may quickly verify that the processor core works correctly at a given configuration or take proactive actions to work around any observed errors. In addition, runtime-generated testcases can also be used to detect the presence of power viruses that target part of or the entire processor. Such a method or system may be deployed to a processor core during execution of a workload, which may provide fast and lightweight checking of in-field systems, unlike exhaustive checking techniques such as memory scrubbing. This may be critical because workload state can be preserved when the testcases are run and the overheads and interruptions to the program could be limited to the order of a few milliseconds every few hours or even days.

Another advantage of such a method or system may include higher processor core utilization, which may in turn improve performance of computer systems because processor cores may no longer be discarded due to errors that could not be found with existing exhaustive scan-based testing, which may not account for various levels of derating inherent in a processor core or a software application. A further advantage may be improved frequency due to guard band reduction, since verification by means of such application-aware testcases can decrease or even eliminate frequency guard bands that may be allocated for aging-related degradation, which would yield a higher operating frequency. Such a method or system may also provide pre-emptive failure detection and actuation because workload-aware testcases generated at runtime can preemptively expose failures in processor core macros without affecting actual workload execution. In the event that a testcase fails, the execution path responsible for the failure, e.g., a single ISU lane, can be shut down and correct execution may continue.

It should also be noted that such a testcase generation methodology can easily be adapted to soft errors as well as different kinds of hard errors. For instance, while the method or system may primarily target stuck-at faults caused due to aging-induced phenomena like electromagnetic effects or time-dependent dielectric breakdown (TDDB), other failure modes such as Negative-bias temperature instability (NBTI)-induced variation of the threshold voltage may also be addressed. The generated testcases can also determine if a specific running workload may be maliciously or unknowingly targeting one or more units/macros by maximizing their switch activity, a condition known as unit-level power virus (UPV), and appropriate mitigation techniques, e.g., throttling execution or terminating a workload thread, can be deployed to limit or eliminate a threat to the processor core or computer system.

As used herein, "unit" may refer to a sub-component of a processor core that may be responsible for a single (pipeline) stage of execution. Also "macro" may refer to an aggregation of latches within a unit tasked with a single specific function and may be expressed as a single register-transfer level (RTL) module.

Referring to FIG. 1, computing environment 100 contains an example of an environment for the execution of at least some of the computer code involved in performing the inventive methods, such as stressmark generation module 150. In addition to stressmark generation module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and stressmark generation module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in stressmark generation module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in stressmark generation module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to provide a real workload-aware methodology for generating synthetic verification testcases, or stressmarks, customized to the workload or set of workloads and designed to maximize the likelihood of failure in macros within the processor core that are the most active in the target workload. In particular, the stressmark generation module 150 may determine a specific set of macros that have a highest switching activity level, or at least above a threshold, with respect to the instruction set of an input workload. To accomplish this, the module 150 may use static profiling of the workloads or the runtime variations of the workload, e.g., monitoring output against the instruction mix of the input workload, observed over a fixed number of epochs, or against on-chip sensor data, such as thermal and NBTI sensors. The module 150 may store the instruction set of the input workload as a stressmark, noting the set of macros that have the most switching activity and therefore would be stressed in the event that the stressmark were run on the processor core. At this point, an output state of the processor core may also be recorded and associated with the customized stressmark as a required output state, such that later testing using the stressmark may determine if a macro is faulty.

Stressmark analysis can be performed at a core level, a processor level, and/or a system level. In exemplary embodiments, a complete energy-wise and microarchitecture-wise taxonomy is generated for a complex-instruction set computer (CISC) processor that includes instruction-wise power and instructions-per-cycle formalisms of each instruction variant present in an instruction set architecture for a CISC architecture. In a CISC architecture, each instruction can be decomposed into a number of micro-operations that may access memory and/or multiple functional units per CISC instruction. Instruction variants can have different instruction lengths, use different addressing modes, and set or react to various condition codes. A configuration context can establish operating parameters and modes, such as a clock frequency, a number of cores that are active, and a level of multithreading. For each instruction variant, configuration context, and microarchitecture behavior, an instruction profile can be generated to collectively form an instruction set profile. Micro-architecture related information can be derived and used to define a reduced size design space on which a solution (such as max-power, min-power, voltage noise stressmarks) can be exhaustively searched in a practical amount of time.

Additionally, at a system level, a workload database can be defined based on the metrics of interest to profile. Workloads define an amount of processing that is to be performed at the same time, such as instruction sequences to execute. Workloads in the workload database can exhibit different levels of behavior relative to a desired metric of interest when executing, such as a high level, a mid-level, and a low level of the desired metric of interest. All possible workload to core mappings can be run, and the metrics of interest of each run can be gathered to define a database relating the workload mapping to metrics of interest values. A statistical analysis may be applied on gathered experimental data that results from mapping of the workloads to the metrics of interest. A metric of interest profile can be defined based on the statistical analysis.

Figure 2:
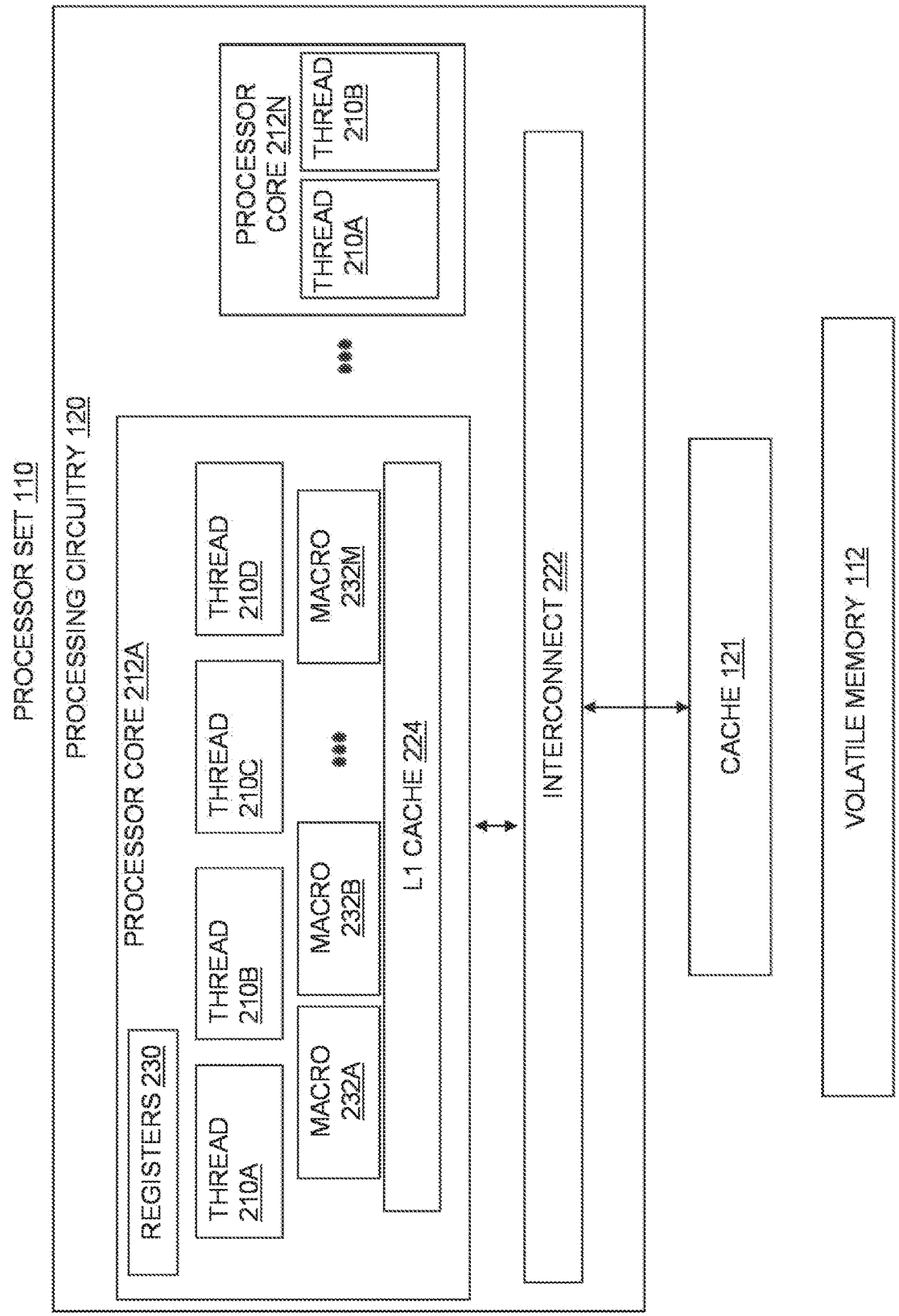
FIG. 2 is an exemplary block diagram of a system under analysis according to an embodiment.
Figure 3:
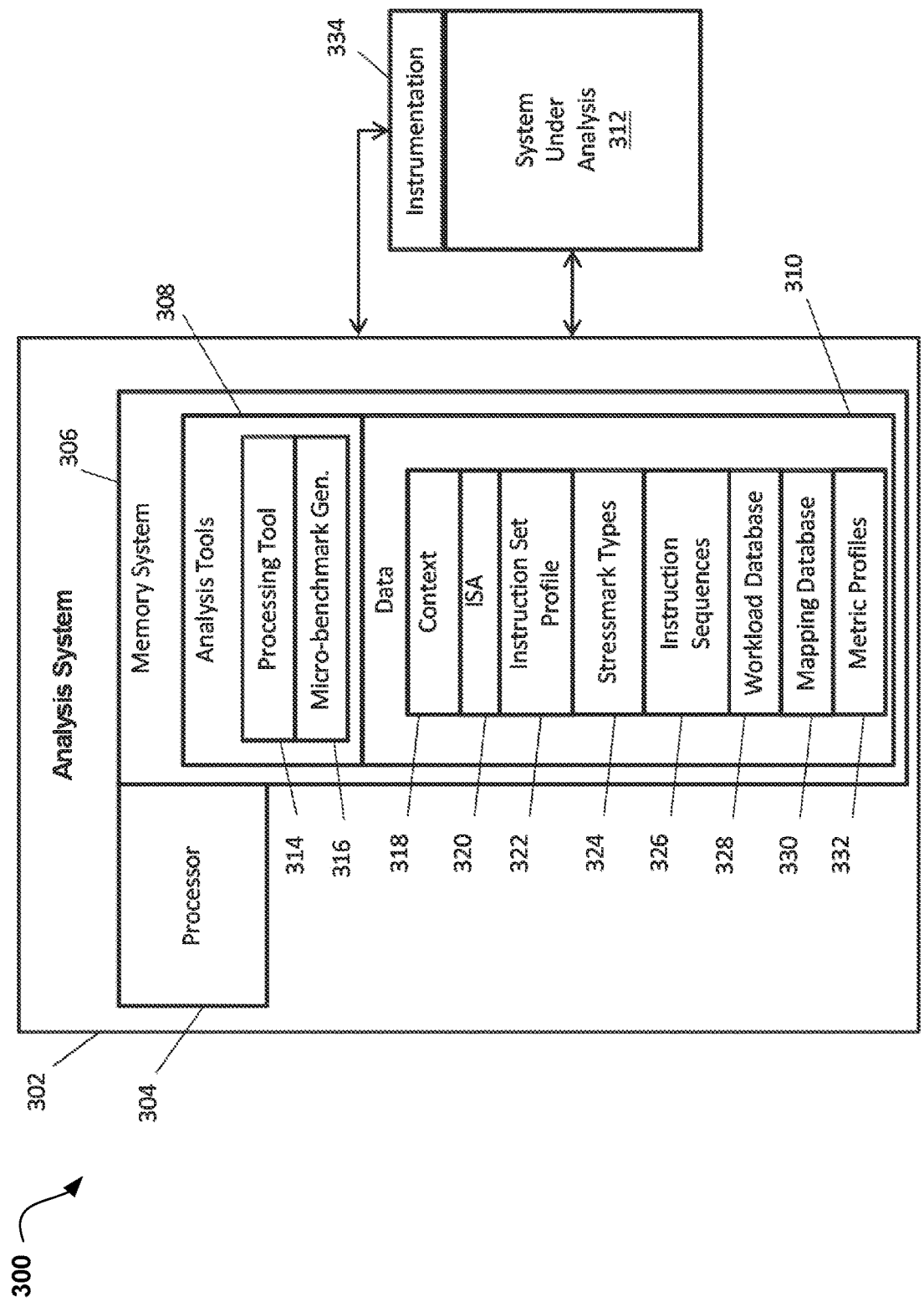
FIG. 3 depicts an analysis system in which various aspects of the embodiments may be implemented.

FIG. 2 depicts an example of processor set 110 in FIG. 1, shown as a simultaneous multithreading (SMT) multicore system according to an embodiment of the system under analysis 312 of FIG. 3 as a targeted multi-core computer system. Processor set 110 may include multiple instances of an SMT processor, shown as equivalent to processor circuitry 120 in FIG. 1, which is a multi-core CISC processor in this example. FIG. 2 shows many SMT processor cores 212A through 212N (generally referred to as SMT processor cores 212, processor cores 212, or cores 212) on one SMT processor die or SMT processor, connected with an interconnect 222, under management of an interconnect control (not shown). Each processor core 212 may have an instruction cache for caching instructions from memory to be executed and a data cache for caching data (operands) of memory locations to be operated on by the processor core 212. In an embodiment, caches of multiple SMT processors are interconnected to support cache coherency between the caches of the multiple SMT processors. The processor core 212 caches may include one level of caching in a hierarchical cache structure. For example, each SMT processor may employ cache 121, as shown, to be shared among all or a subset of the processor cores 212 on the SMT processor 202 between the SMT processor 202 and volatile memory 112. Additionally, each processor core 212 may have its own L1 cache 224 directly on the processor core 212, where the L1 cache 224 is not shared among the different processor cores 212 but is a core-internal cache. Also, each processor core 212 may have one or more registers 230 for storing small amounts of data, status, and configuration information.

It is understood that the processor cores 212 are physical devices or simulated instances thereof that include all the circuitry (i.e., hardware along with firmware) necessary to execute instructions as understood by one skilled in the art.

Although the processor circuitry 120 may include multiple processor cores 212, various examples may be provided with reference to processor core 212A for ease of understanding and not limitation. It is understood that further details shown and discussed relative to processor core 212A apply by analogy to all processor cores 212, and these details may be included in all of the processor cores 212.

The processor core 212A is shown with four threads 210A, 210B, 210C, and 210D (also referred to as thread0, thread1, thread2, and thread3, and generally referred to as thread or threads 210), and each thread 210A-210D may include a separate sequence of instructions or instruction stream, such as a program or portion thereof that can be provided from the instruction sequences 326 and/or workload database 328 of FIG. 3. Each processor core 212A-212N may be configured to support different levels of SMT, i.e., a different number of threads 210. In the example of FIG. 2, processor core 212A is in SMT-4 mode, meaning that four threads 210A-210D are configured to execute in parallel, while processor core 212N is in SMT-2 mode with threads 210A and 210B. A processor core 212 may be configured in a single thread mode or a higher order mode with a higher number of threads depending upon implementation.

At an architecture level, each thread 210 may represent an independent central processing unit (CPU). Instructions which the thread 210 has for execution by the processor core 212 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units, such as macros 232A, 232B, . . . , 232M of each processor core 212 can be accessed in parallel by executing one or more of the instructions in a thread 210 using a processing pipeline and micro-operation sequencing. Macros 232A-232M can include, for example, one or more fixed-point execution units, floating-point execution units, vector execution units, load/store units, branch control units, and the like.

Referring to FIG. 3, a system 300 is generally shown that includes an analysis system 302 configured to generate and apply stressmarks on a system under analysis 312. The system under analysis 312 can be a physical system or a simulated system. For example, the system under analysis 312 may be in raw wafer form (that is, as a single wafer that has multiple unpackaged chips), as a bare die, or in a packaged form. In the latter case the system under analysis 312 can be mounted in a single chip package (such as a plastic carrier, with leads that are affixed to a motherboard or other higher level carrier) or in a multichip package (such as a ceramic carrier that has either or both surface interconnections or buried interconnections). The system under analysis 312 may also be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. It should be noted that FIG. 2, described above, depicts one example of elements that may be incorporated within the system under analysis 312 regardless of physical packaging or level of physical realization.

The analysis system 302 may include a processor 304 and a memory system 306 (also referred to as memory). The processor 304 can be any type of processing circuitry or microcontroller, including multiple instances thereof, that is configurable to execute processes further described herein, where the memory system 306 is an example of a tangible storage medium. The memory system 306 can include analysis tools 308 and data 310. The analysis tools 308 may be partitioned as one or more computer program products. For example, the analysis tools 308 can include a processing tool 314 and a micro-benchmark generator 316 among other executable applications (not depicted). The data 310 can include a variety of records, files, and databases, such as a configuration context 318, an instruction set architecture (ISA) 320, an instruction set profile 322, stressmark types 324, instruction sequences 326, a workload database 328, a mapping database 330, metric profiles 332, and other data (not depicted) as further described herein.

In an exemplary embodiment, the processor 304 is coupled to the memory system 306, and the processor 304 is configured to execute the analysis tools 308 to analyze the ISA 320 of the system under analysis 312 and generate the instruction set profile 322 for each architectural instruction variant of the ISA 320. The system under analysis 312 can include at least one CISC processor that is targeted by analysis at the processor or core level to determine a combination of instruction sequences 326 for a targeted CISC processor of the system under analysis 312 from the instruction set profile 322 that corresponds to a desired stressmark type of the stressmark types 324. The desired stressmark type can define a metric representative of functionality of interest of the targeted CISC processor.

The processing tool 314 may orchestrate an analysis process as well as perform pre and post processing operations on data generated by the micro-benchmark generator 316. The micro-benchmark generator 116 can develop benchmark data on a variety of performance metrics and on an instruction basis for an instruction or sequence of instructions. The micro-benchmark generator 316 may operate in a simulation environment that is configured with architecture and performance characteristics of the system under analysis 312 or may directly interface with a physical instance of the system under analysis 312 using instrumentation 334. The instrumentation 334 can include current monitors, voltage monitors, temperature monitors, noise level monitors, and the like.

The processing tool 314 or other portion of the analysis tools 308 can define a set of workloads in the workload database 328 for the system under analysis 312 based on a plurality of metrics of interest to profile. The system under analysis 312 can be a multi-core computer system that is targeted for performance analysis, such as one or more multi-core and multi-threading CISC processors. The results of stressmark analysis for metrics such as power, energy, temperature, instructions-per-cycle, etc. can be used to identify which instruction sequences 126 or combinations of the instruction sequences 326 should be stored in the workload database 328. A plurality of workload-to-core mappings for the workloads can be generated and stored in the mapping database 330 to define which workloads from the workload database 328 should be mapped to particular processor cores in the system under analysis 312 for multiple metrics of interest. Statistical analysis can be applied to a mapping of the workloads to the metrics of interest in the mapping database 330 to define the metric profiles 332 for the system under analysis 312. Further details are provided herein.

Figure 4:
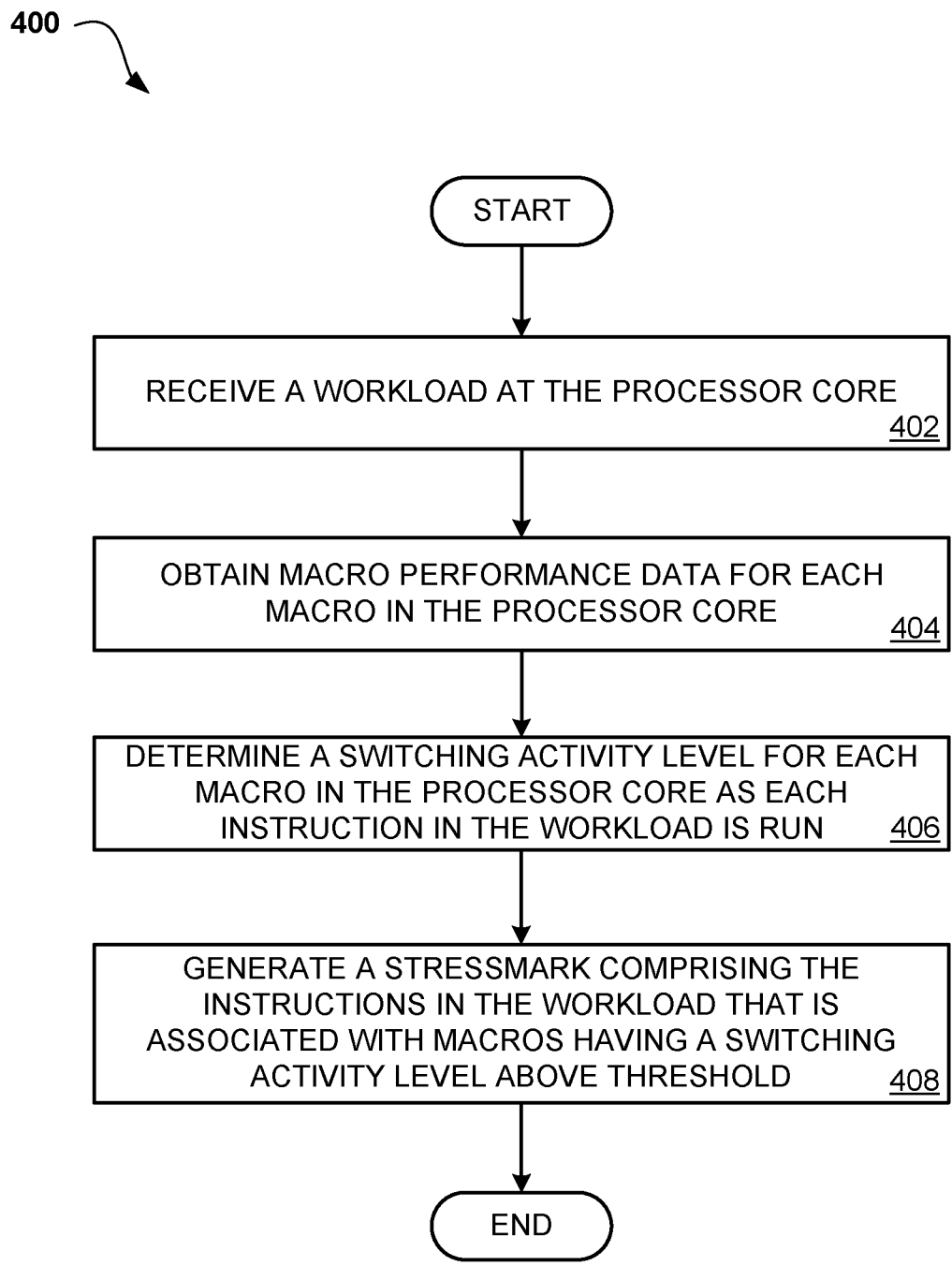
FIG. 4 depicts a flow chart diagram for a process that customizes generation and application of stress test conditions in a processor core according to an embodiment.

Referring to FIG. 4, an operational flowchart illustrating a process 400 that customizes generation and application of stress test conditions in a processor core is depicted according to at least one embodiment. At 402, a workload may be received by a processor core. CPU workload in the context described herein may include one or more instructions to be carried out by the processor core. In addition, a processor core may be partitioned into several standalone components known as macros, e.g., register-transfer level (RTL) modules, that each perform a specific function depending on the instruction currently running on the processor core. Because different instructions may exercise different macros by causing varying levels of switching activity, a workload may especially stress specific components of a processor core. As mentioned below, this switching activity may be measured for each instruction included in the workload and the instruction mix of the workload may be stored as a custom stressmark, or stress test condition, to be used to discover errors in a processor core.

At 404, performance data related to the processor core, and specifically each macro of the processor core, may be obtained once the workload is received at the processor core. Many workloads, or workload types, may be known to cause certain switching activity or generate known values of various metrics that may be measured in a processor core. For instance, common software applications such as routine maintenance on a computer system may include instruction sets and mixes that generate known values. However, this step may also obtain real-time performance data if such static profiling has not been done in the past or if the workload and its component instruction set are not known to the computer system. As an example, if a computer system is typically used for one type of function in an organization and a new function has been added to the computer system, then new instruction sets may be introduced to the processor core and performance data may be obtained for the new instructions.

One of ordinary skill in the art would recognize that there are many metrics that may be used to determine switching activity in a processor macro and the activity may depend on the type of vulnerability to be stressed, which in turn could be maximized across a maximum number of macros in the processor core. A non-exhaustive list of example metrics may include cycle switching for the purpose of maximizing consumed power or data residency in order to maximize a soft-error rate or switching density, i.e., switching per unit area, for maximizing thermal or aging induced vulnerability.

At 406, a switching activity level for each macro in the processor core may be determined based on the obtained performance data as each instruction in the workload is run on the processor core. Switching activity for a macro may be defined as an average of the switching activity per instruction across all instructions in a workload sequence, while a switching activity may also be determined for an instruction through a sum of switching activity across all macros when the instruction is run. In addition to the above metrics, a vulnerability of the processor core may be calculated based on the switching activity, macro coverage and the number of instructions per clock cycle of the processor core.

In an embodiment, a supervised machine learning model may be trained to predict a switching activity level for a macro based on the performance data. In the case of a common workload that may have already been profiled, the switching activity level of individual macros and the macros with the most activity may be predicted and testcases stored for further use. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include routine performance data that may be received for common workloads or instruction sets by a processor core or its component macros. The training data may be collected from a single processor macro or a group of macros or multiple processor cores. The prediction results may be stored in a database so that the data is most current, and the output would always be up to date.

An example of the utility of learning a pattern of switching activity levels for common workloads, along with understanding, as described below, a required output state for a processor core may be the prevention or mitigation of malicious conditions such as a unit-level power virus that may attack a system through switching activity that is much higher than normal. If switching activity above a maximum threshold is detected and it is known that a workload should not cause switching activity above a lower amount, then the processor core may be turned off or the workload may be suspended or terminated to prevent damage to the processor core.

At 408, a stressmark, or set of instructions meant to induce certain stress conditions on individual macros or a processor core, may be generated from the instructions that are included in the workload. In an embodiment, the generated stressmark may be stored in a stressmark database, e.g., workload database 328, for retrieval in the event that a processor core requires stress testing. In addition, the module 150 may determine macros that should be associated with the stressmark by analyzing the switching activity and utilizing a minimum threshold, where those macros with activity above the threshold may be associated with the stressmark and those with low or no activity may be eliminated from consideration. The association may also be stored with the stressmark in the database or indexed storage. An analysis of the state of a processor core or individual macros may also be determined, such that the module 150 may determine a required output state for the instruction set of the current workload and may store the required output state in the stressmark database. This required output state may be useful in determining appropriate switching activity or other behavior of a workload, or instruction set, and aid in detecting malicious behavior or other activity. As an example, switching activity above a minimum level, or "low watermark", may be detected, where the low watermark may be a level beyond which no workload should stress a macro or processor core. This elevated switching activity could lead the module 150 to suspect malicious activity and, should the switching level subsequently rise above a maximum threshold, or "high watermark", a processor core could be deactivated or a workload suspended or terminated to prevent the malicious activity. It should be noted that the "watermarks", as described above, may be predicted from the machine learning process described above, where a level of switching activity may be predicted from levels of prior workloads to determine behavior of a processor core. Also, one of ordinary skill in the art would recognize that the overall output state of a processor core may not be limited to switching activity, there may be other metrics used to determine an output state to compare to the required output state of a processor core.

One of ordinary skill in the art would also recognize that, should some macros pass the stress tests that are embodied in specific stressmarks while other macros fail, workloads may be shifted by the module 150 to avoid the faulty units within a processor core, such that an entire processor core is not taken offline and computing resources are not lost in the event of partial failure. For instance, the module 150 can inform a controller that specific instructions may not be run on certain processor cores but other instructions may be run on a partially faulty core, thereby allowing some workloads to continue to be processed if there are no instructions that are substantially dependent on macros that may have been determined to be faulty.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for customizing generation and application of stress test conditions in a processor core, the computer-implemented method comprising:
    receiving a workload at the processor core, wherein the workload includes a plurality of instructions and the processor core comprises a plurality of macros;
    obtaining macro performance data for each macro in the plurality of macros from the processor core;
    determining a switching activity level for each macro in the plurality of macros of the processor core when each instruction in the plurality of instructions is run based on the macro performance data for each macro in the plurality of macros of the processor core; and
    generating a stressmark to induce certain stress conditions comprising the plurality of instructions included in the workload, wherein the stressmark is associated with a macro in the plurality of macros of the processor core when the switching activity level for the macro in the plurality of macros of the processor core is above a minimum threshold.

2. The computer-implemented method of claim 1, further comprising:
    determining a required output state of the processor core when the workload runs on the processor core; and
    associating the required output state of the processor core with the stressmark.

3. The computer-implemented method of claim 2, further comprising:
storing the stressmark in a stressmark database, wherein the stressmark database associates the stressmark with the macro in the plurality of macros of the processor core and the required output state of the processor core.

4. The computer-implemented method of claim 3, further comprising:
identifying a candidate macro in the plurality of macros of the processor core;
selecting a related stressmark from the stressmark database, wherein the candidate macro is associated with the related stressmark;
determining a test output state of the processor core by running the related stressmark on the processor core; and
deactivating the processor core when the test output state of the processor core does not meet the required output state of the processor core.

5. The computer-implemented method of claim 1, wherein the workload is suspended in the processor core when the switching activity level for the macro in the plurality of macros of the processor core is above a maximum threshold.

6. The computer-implemented method of claim 1, wherein the macro performance data for each macro in the plurality of macros of the processor core comprises one or more metrics selected from a group consisting of: cycle switching, data residency, and switching density.

7. The computer-implemented method of claim 1, wherein a machine learning model that predicts a switching activity level for each macro in the plurality of macros of the processor core based on running workloads is used to determine the minimum threshold for the switching activity level for each macro in the plurality of macros of the processor core.

8. A computer system for customizing generation and application of stress test conditions in a processor core, the computer system comprising:
one or more processors, one or more memories, and one or more computer-readable storage media; and
program instructions., stored on at least one of the one or more computer-readable storage media for execution by at least one of the one or more processors via at least one of the one or more memories, to receive a workload at the processor core, wherein the workload includes a plurality of instructions and the processor core comprises a plurality of macros;
program instructions, stored on at least one of the one or more computer-readable storage media for execution by at least one of the one or more processors via at least one of the one or more memories, to obtain macro performance data for each macro in the plurality of macros from the processor core;
program instructions, stored on at least one of the one or more computer-readable storage media for execution by at least one of the one or more processors via at least one of the one or more memories, to determine a switching activity level for each macro in the plurality of macros of the processor core when each instruction in the plurality of instructions is run based on the macro performance data for each macro in the plurality of macros of the processor core; and
program instructions, stored on at least one of the one or more computer-readable storage media for execution by at least one of the one or more processors via at least one of the one or more memories, to generate a stressmark to induce certain stress conditions comprising the plurality of instructions included in the workload, wherein the stressmark is associated with a macro in the plurality of macros of the processor core when the switching activity level for the macro in the plurality of macros of the processor core is above a minimum threshold.

9. The computer system of claim 8, further comprising:
program instructions, stored on at least one of the one or more computer-readable storage media for execution by at least one of the one or more processors via at least one of the one or more memories, to determine a required output state of the processor core when the workload runs on the processor core; and
program instructions, stored on at least one of the one or more computer-readable storage media for execution by at least one of the one or more processors via at least one of the one or more memories, to associate the required output state of the processor core with the stressmark.

10. The computer system of claim 9, further comprising:
program instructions, stored on at least one of the one or more computer-readable storage media for execution by at least one of the one or more processors via at least one of the one or more memories, to store the stressmark in a stressmark database, wherein the stressmark database associates the stressmark with the macro in the plurality of macros of the processor core and the required output state of the processor core.

11. The computer system of claim 10, further comprising:
program instructions, stored on at least one of the one or more computer-readable storage media for execution by at least one of the one or more processors via at least one of the one or more memories, to identify a candidate macro in the plurality of macros of the processor core;
program instructions, stored on at least one of the one or more computer-readable storage media for execution by at least one of the one or more processors via at least one of the one or more memories, to select a related stressmark from the stressmark database, wherein the candidate macro is associated with the related stressmark;
program instructions, stored on at least one of the one or more computer-readable storage media for execution by at least one of the one or more processors via at least one of the one or more memories, to determine a test output state of the processor core by running the related stressmark on the processor core; and
program instructions, stored on at least one of the one or more computer-readable storage media for execution by at least one of the one or more processors via at least one of the one or more memories, to deactivate the processor core when the test output state of the processor core does not meet the required output state of the processor core.

12. The computer system of claim 8, wherein the workload is suspended in the processor core when the switching activity level for the macro in the plurality of macros of the processor core is above a maximum threshold.

13. The computer system of claim 8, wherein the macro performance data for each macro in the plurality of macros of the processor core comprises one or more metrics selected from a group consisting of: cycle switching, data residency, and switching density.

14. The computer system of claim 8, wherein a machine learning model that predicts a switching activity level for each macro in the plurality of macros of the processor core based on running workloads is used to determine the minimum threshold for the switching activity level for each macro in the plurality of macros of the processor core.

15. A computer program product for customizing generation and application of stress test conditions in a processor core, the computer program product comprising:
   one or more computer-readable storage media; and
   program instructions, stored on at least one of the one or more computer-readable storage media, to receive a workload at the processor core, wherein the workload includes a plurality of instructions and the processor core comprises a plurality of macros;
   program instructions, stored on at least one of the one or more computer-readable storage media, to obtain macro performance data for each macro in the plurality of macros from the processor core;
   program instructions, stored on at least one of the one or more computer-readable storage media, to determine a switching activity level for each macro in the plurality of macros of the processor core when each instruction in the plurality of instructions is run based on the macro performance data for each macro in the plurality of macros of the processor core; and
   program instructions, stored on at least one of the one or more computer-readable storage media, to generate a stressmark to induce certain stress conditions comprising the plurality of instructions included in the workload, wherein the stressmark is associated with a macro in the plurality of macros of the processor core when the switching activity level for the macro in the plurality of macros of the processor core is above a minimum threshold.

16. The computer program product of claim 15, further comprising:
   program instructions, stored on at least one of the one or more computer-readable storage media, to determine a required output state of the processor core when the workload runs on the processor core; and
   program instructions, stored on at least one of the one or more computer-readable storage media, to associate the required output state of the processor core with the stressmark.

17. The computer program product of claim 16, further comprising:
   program instructions, stored on at least one of the one or more computer-readable storage media, to store the stressmark in a stressmark database, wherein the stressmark database associates the stressmark with the macro in the plurality of macros of the processor core and the required output state of the processor core.

18. The computer program product of claim 17, further comprising:
   program instructions, stored on at least one of the one or more computer-readable storage media, to identify a candidate macro in the plurality of macros of the processor core;
   program instructions, stored on at least one of the one or more computer-readable storage media, to select a related stressmark from the stressmark database, wherein the candidate macro is associated with the related stressmark;
   program instructions, stored on at least one of the one or more computer-readable storage media, to determine a test output state of the processor core by running the related stressmark on the processor core; and
   program instructions, stored on at least one of the one or more computer-readable storage media, to deactivate the processor core when the test output state of the processor core does not meet the required output state of the processor core.

19. The computer program product of claim 15, wherein the workload is suspended in the processor core when the switching activity level for the macro in the plurality of macros of the processor core is above a maximum threshold.

20. The computer program product of claim 15, wherein a machine learning model that predicts a switching activity level for each macro in the plurality of macros of the processor core based on running workloads is used to determine the minimum threshold for the switching activity level for each macro in the plurality of macros of the processor core.

* * * * *